Sept. 29, 1953  D. M. MANNING  2,653,827
VERTICALLY ADJUSTABLE TRUCK TRAILER
Filed Sept. 21, 1949  4 Sheets-Sheet 1
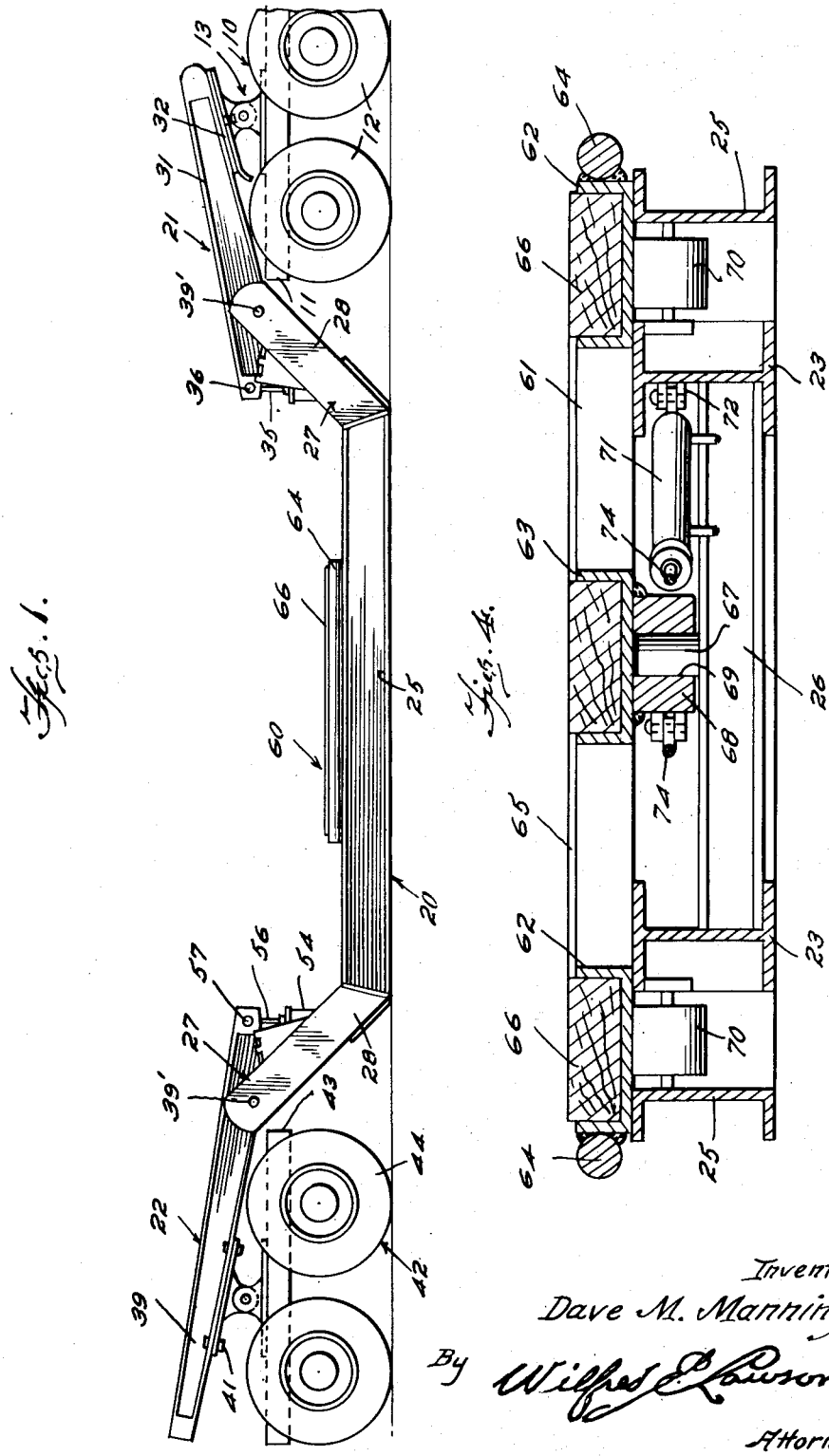
Inventor
Dave M. Manning
By Wilfred E. Lawson
Attorney Sept. 29, 1953 D. M. MANNING 2,653,827
VERTICALLY ADJUSTABLE TRUCK TRAILER
Filed Sept. 21, 1949 4 Sheets-Sheet 2
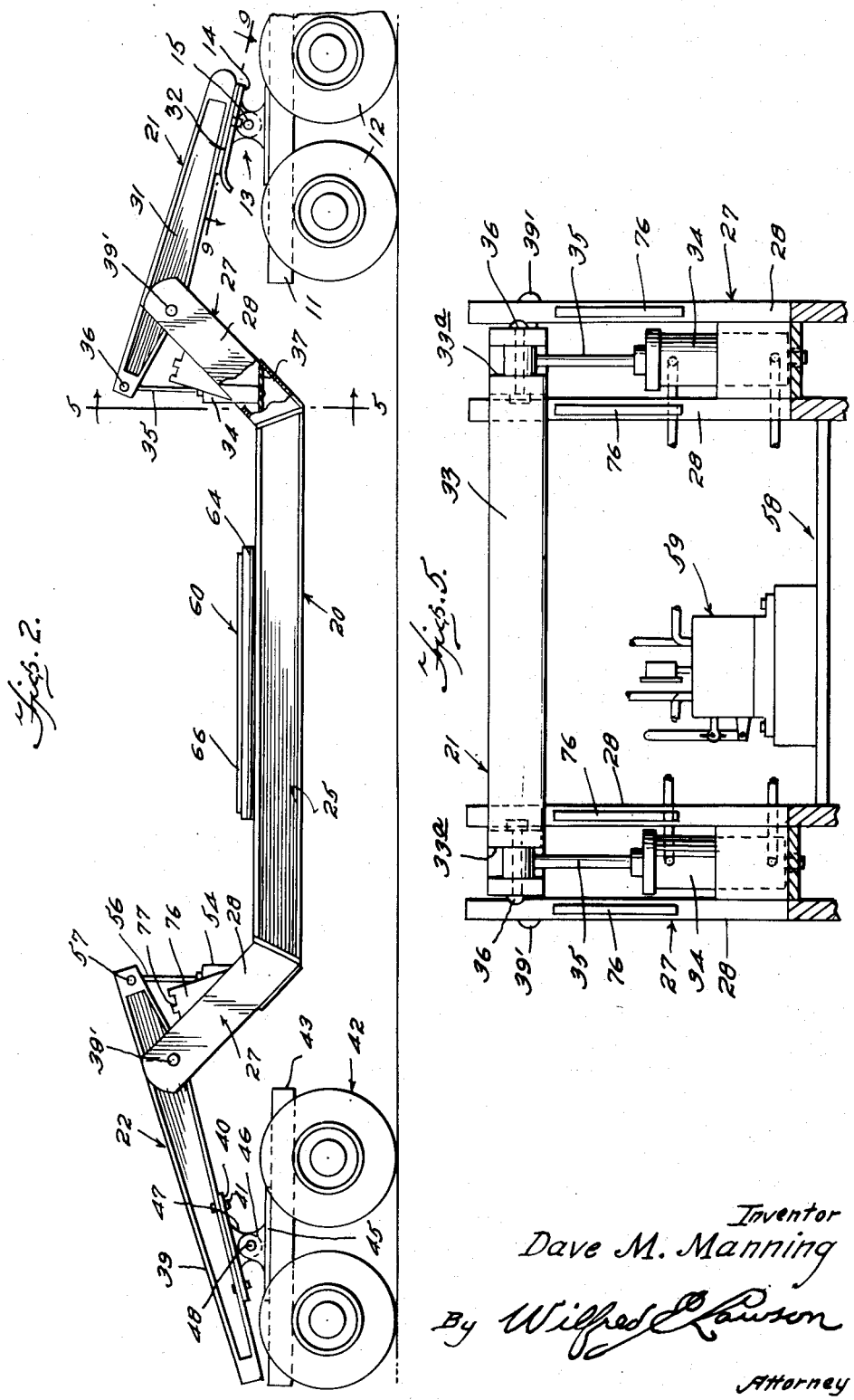
Inventor
Dave M. Manning
By Wilfred E. Lawson
Attorney

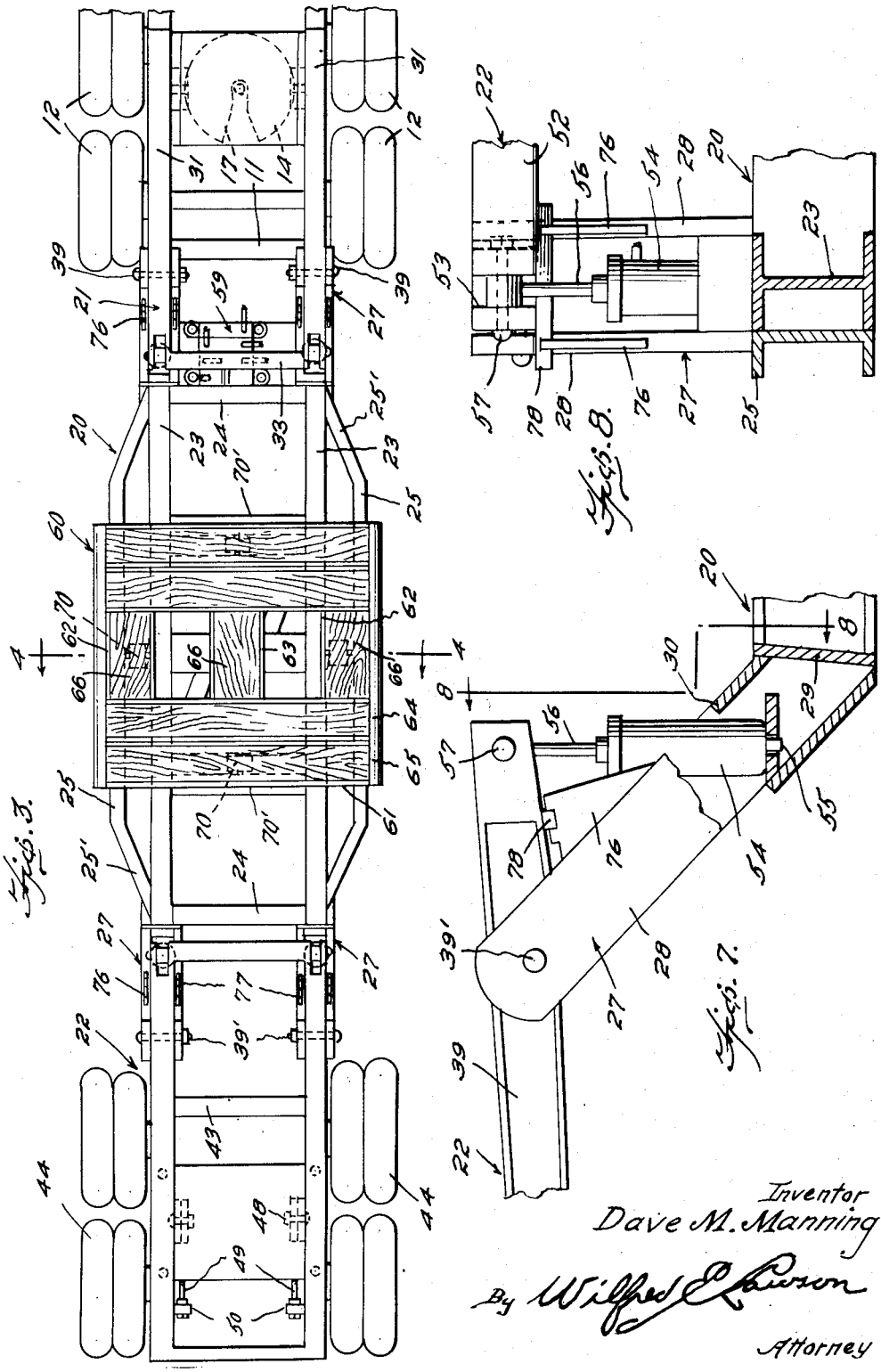

Sept. 29, 1953 D. M. MANNING 2,653,827
VERTICALLY ADJUSTABLE TRUCK TRAILER
Filed Sept. 21, 1949 4 Sheets-Sheet 4
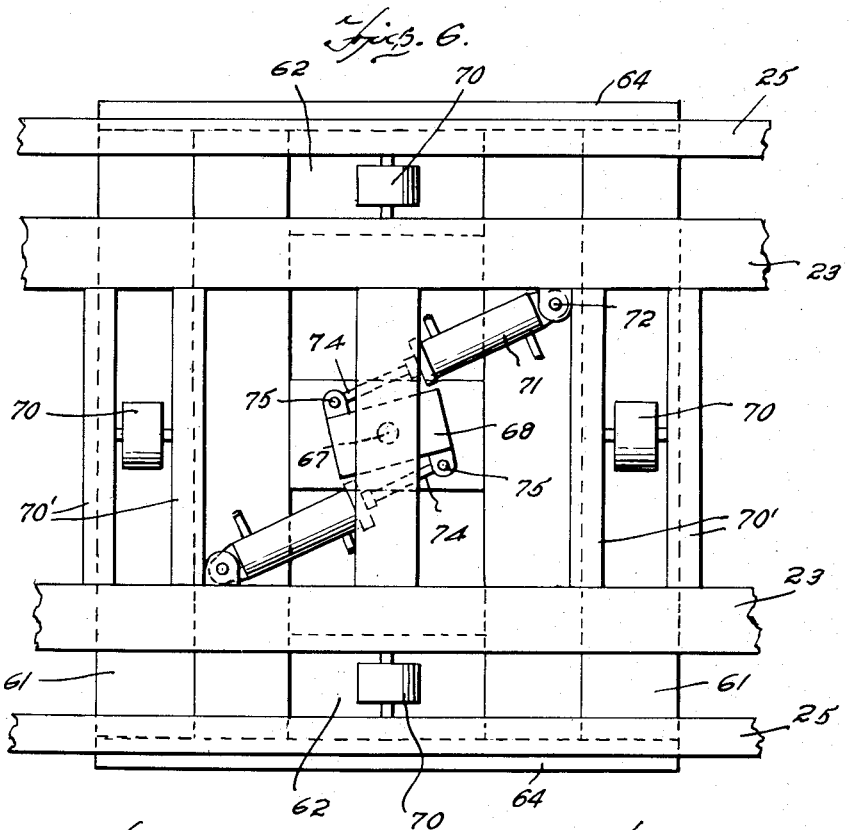
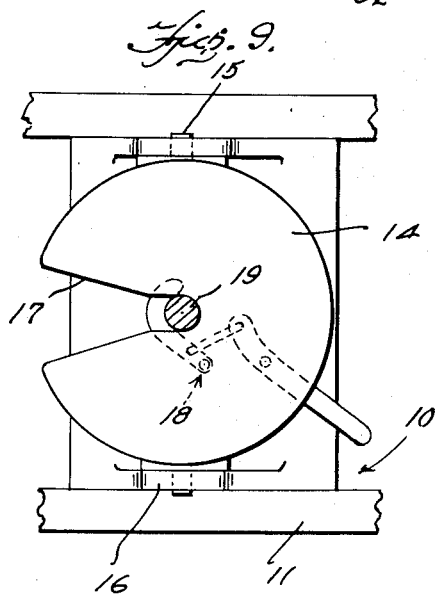
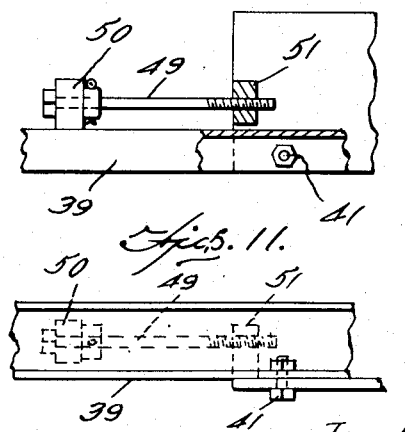
Inventor
Dave M. Manning
By Wilfred E. Lawson
Attorney Patented Sept. 29, 1953

2,653,827

UNITED STATES PATENT OFFICE 2,653,827

VERTICALLY ADJUSTABLE TRUCK TRAILER

Dave M. Manning, Hysham, Mont.

Application September 21, 1949, Serial No. 116,998

7 Claims. (Cl. 280—44)

This invention relates generally to the class of wheeled vehicles and is directed particularly to improvements in truck trailers.

The present invention has to do with heavy hauling equipment and has for a principal object to provide a novel and improved trailer construction designed for hauling heavy machinery or other heavy and cumbersome bodies and constructed in a novel manner whereby heavy pieces of mobile equipment such as tractors and the like may be easily placed upon the trailer without the employment of ramps or other removable runways or equipment for lifting such pieces of machinery onto the trailer.

Another object of the present invention is to provide an improved trailer truck of the character stated having a load supporting section which is hung between front and rear carriers and which is adapted to be elevated or lowered whereby, when lowered, the loading of the trailer may be easily accomplished and the load may then be elevated from the ground and carried or moved in such elevated position.

A further object of the invention is to provide an improved trailer truck construction having a load carrying section and front and rear sections which are mounted upon wheeled trucks, with a power mechanism operatively coupled between the front and rear sections and the middle or load carrying section for effecting relative pivotal movement on transverse horizontal axes, between the load carrying section and the front and rear sections whereby to bring about a raising or lowering of the middle load carrying section, as may be required.

A further object of the invention is to provide heavy duty trailer structure having front and rear end sections supported for vertical oscillation and an intermediate or central load carrying section pivotally coupled to the front and rear sections to swing or hang therebetween, with power mechanism operatively connecting the front and rear sections with the central section whereby said front and rear sections may be vertically oscillated as desired to effect the elevation or lowering of the central section from a maximum lowered position in which it rests upon the ground to an elevated position whereby such load carrying central section may readily pass over high places in a roadway as for example railroad crossings and the like.

A still further object of the invention is to provide a trailer construction of the above described character wherein the load carrying section is equipped with a power driven turntable whereby a long piece of equipment such as a tractor or the like may be readily run onto the turntable when the load carrying section is fully lowered and then rotated 90° to place the length of the supported load longitudinally of the trailer to thereby prevent excessive projection of the load beyond the sides of the trailer.

The invention will be best understood from a consideration of the following detailed description taken in connection with the accompanying drawings forming a part of the specification, with the understanding, however, that the invention is not to be limited to the exact details of construction shown and described since obvious modifications will occur to a person skilled in the art.

In the drawings:

Figure 1 is a view in side elevation of a trailer structure constructed in accordance with an embodiment of the present invention and showing the load supporting section in fully lowered position.

Figure 2 is a view corresponding to Figure 1 but showing the central load carrying section in elevated position.

Figure 3 is a view in top plan of the structure.

Figure 4 is a transverse section taken substantially on the line 4—4 of Figure 3.

Figure 5 is a sectional view taken transversely of the central section substantially on the line 5—5 of Figure 2.

Figure 6 is a bottom plan or underneath view of the load carrying central portion or sling portion of the trailer showing the turntable operating means.

Figure 7 is a detailed view on an enlarged scale of the coupling between an end of the central or sling unit and an end section of the trailer showing the mounting for the power cylinder and also illustrating a chock means for locking together the central or sling section and the adjacent end section.

Figure 8 is a sectional view taken substantially on the line 8—8 of Figure 7 showing the position of the chock between the supporting means therefor and the ends of the arms of the oscillating end section.

Figure 9 is a view illustrating the fifth wheel of the tractor with which the front oscillatable section of the trailer is detachably connected.

Figure 10 is a detail view illustrating detachable coupling means and adjusting means between the trailer wheel truck and the rear vertically oscillatable unit of the trailer.

Figure 11 is a view in side elevation of the structure shown in Figure 10.

Referring now more particularly to the drawings the numeral 10 generally designates the rear end portion of a tractor truck, the rear end of the chassis frame of which is designated 11 while the supporting wheels forming a part of the tractor wheel truck, are designated 12.

Pivotally supported upon the tractor wheel truck chassis frame 11 for oscillation on a horizontal axis extending transversely of the frame is the usual fifth wheel unit which is generally designated 13 and which, as shown in Figure 9, comprises the plate 14 which is mounted upon trunnions 15 for rocking movement on an axis extending transversely of the chassis frame, the trunnions being supported in bearings 16.

The plate 14 has the usual rearwardly opening slot 17 and carries a locking means generally designated 18 for securing in the inner end of the slot, which is at the center of the disk 14 and upon the longitudinal center of the tractor truck, the fifth wheel pin or king pin 19 which is carried by the attached trailer structure about to be described.

The fifth wheel construction illustrated in Figure 9 is of standard well known form and in itself forms no part of the present invention.

The trailer structure comprises three main units which are the central load carrier unit which is generally designated 20, the front or forward rock frame unit which is generally designated 21 and the rear rock frame unit which is generally designated 22.

The central unit 20 has been here illustrated as being in the form of a platform which is pivotally suspended between or slung from the front and rear rock frame units but it is to be understood that the central unit may also be in the form of a receptacle body for carrying loose material, if desired, in addition to being flat or in the form of a platform as here illustrated.

The central load carrier unit as here illustrated, comprises a long horizontally disposed frame having the longitudinal side members 23 and the cross connecting end members 24. These side and end members are preferably in the form of I beams.

Disposed upon the outer side of each beam 23 in spaced parallel relation therewith is a reinforcing channel beam 25 which has at each end the oblique inwardly directed terminal portion 25' which is joined to the adjacent end of the side beam 23 by welding or any other suitable manner.

At the transverse center of the platform frame is the low short cross beam 26, the height of which, as shown in Figure 4, is approximately half the height of the I beams 23 between which it is mounted, for the purpose hereinafter set forth.

At each end of each of the longitudinal side beams 23 of the platform is an upwardly and longitudinally outwardly inclined suspension arm which is generally designated 27. Each of these suspension or hanger arms 27 comprises two spaced parallel beams 28 which are joined together at their lower ends by an end plate 29 and a web plate 30 as shown in Figure 7.

The front or forward rock frame unit 21 comprises two horizontally spaced longitudinally extending side beams 31 which, adjacent to their forward ends are secured upon the top of a transverse fifth wheel plate 32 which carries upon its underside the downwardly projecting pivot or king pin 19 hereinbefore referred to. This plate 32 rides onto the fifth wheel 14, the pin 19 engaging in the slot 17 where it is secured by the locking mechanism 18.

The rear ends of the beams 31 are connected together by the transverse bar 33 and the rear end of each beam 31 is bifurcated as indicated at 33a.

Supported directly beneath the bifurcated part 33a of each beam 31 is an upright piston cylinder 34 from which extends upwardly a piston rod 35 which is secured within the adjacent bifurcation 33a upon the transverse pivot pin 36. This piston cylinder 34 may be mounted in any suitable manner to permit of slight front and rear oscillatory movement in the operation of the mechanism, the mounting here shown comprising, as shown in Figure 2, a shelf plate 37.

Each of the front or forward arms 27 has positioned between the upper ends of the two parts or beams 28 thereof, the adjacent forward rock frame beam 31 which is oscillatably coupled with the arm 28 by a pivot pin 39' having its turning axis transversely of the structure. As shown the pivots 39' are positioned rearwardly of the transverse centers of the beams 31 so that a short portion of the beam at its rear end projects rearwardly of the upper end of the arm 28 and the piston rod and cylinder coupling between the adjacent end of the platform and the short end of the beam connects across the angle formed by the beam 31 and arm 28 so that upon the extension of the piston rod outwardly the angle will be increased and the frame unit 21 will oscillate on the front transversely directed pivot trunnions 15.

The rear rock frame unit 22 is constructed in a similar manner to the unit 21. This rear unit comprises the transversely spaced longitudinally extending side beams 39 which rest upon the transverse supporting plate 40. This plate is detachably connected with the beams 39 by bolts 41 whereby the rear unit 22 may be uncoupled from the underlying wheel truck structure which is generally designated 42. This rear wheel truck or trailer truck comprises a frame 43 and ground engaging supporting wheels 44.

Resting upon the frame 43 is the plate 45 and this plate and plate 46 have interengaging pivot ears 46 and 47 respectively which are pivotally coupled by the transversely directed pivot pins 48.

The rear rock frame unit 22 is detachably coupled with the trailer wheel truck supported plate 40 so that the units 20, 21 and 22 may be removed and the truck 42 employed in association with the tractor wheel truck for hauling timbers or the like.

In order to facilitate the lining up of the bolt holes in the flanges of the beams 39 and in the plate 40 when the unit 22 is to be reassembled on the trailer wheel truck 42, there is provided upon the inner side of each beam 39 an adjustment screw 49. This screw 49 is swivelly supported at its head end in a stud 50 carried upon the adjacent beam 39 while its other end which is screw threaded, is threadably engaged in a nut 51 which is secured to the adjacent edge of the plate 40 as shown in Figure 10. Thus it will be seen that when the unit 22 is replaced upon the plate 40 and the screws threadably engaged in the adjacent nuts 51, by rotating the screws 49 the unit can be shifted forwardly or rearwardly upon the plate 40 to bring the apertures for the bolts 41 into proper alignment.

The forward ends of the beams 39 are connected by a transverse bar or beam 52 corresponding to the beam 32 of the forward unit and the rear ends of the longitudinal beams 39 are also bifurcated as indicated at 53 like the forward beams 31.

Each of the rear arms 27 likewise has supported between the lower ends of the members 28 thereof the upright piston cylinder 54 which rests upon a plate or platform 55 while the upper end of the piston rod 56 is pivotally secured or connected within the bifurcation 53 of the adjacent beam 39 by means of the pin 57 as shown in Figure 8.

Extending transversely of the structure between the lower ends of the forward arms 27, is a support plate 58, as shown in Figure 5 upon which is mounted a control unit by means of which fluid pressure is transmitted to and caused to be returned from the elevating cylinders 34 and 54 at the front and rear ends of the platform. This control or fluid distributing unit is of a well known type and is generally designated 59. This unit is of standard well known construction and accordingly it is believed that a detailed description of the same is not necessary except to set forth that it receives fluid pressure from a pressure pump forming a part of the standard equipment of every tractor truck and distributes the fluid to the piston cylinders as explained and effects the return of the fluid to the fluid reservoir from the cylinders as necessary.

The unit 59 also controls the operation of the hereinafter described power units for rotating the load supporting turntable which is generally designated 60, supported upon the carrier unit or platform 20.

The turntable 60 comprises a flat substantially square structure as shown in Figure 3 which is made up of four channel beams 61 disposed in parallel relation with the channels directed upwardly and arranged in two pairs as shown in Figure 3. The beams making up each pair are in side by side abutting relation and extending across the space between the innermost beams of the two pairs are the short outer channel beams 62 and a central channel beam 63, the channels of which are also directed upwardly.

The outer ends of the beams 61 have secured thereacross and welded thereto a length of steel shafting or a steel rod 64 as shown in Figure 3, each of such shafts or rods being also disposed along the outer side of a short beam 62 as is clearly shown in Figure 3.

Each of the upturned or upwardly directed channel beams 61 has placed therein a wooden timber 65 and each of the short connecting channel beams 62 and 63 also has a section of timber placed therein as indicated at 66 in Figures 3 and 4. As is also shown in Figure 4 the thickness of each timber is slightly greater than the depth of the channel in which it is placed so that part of the timber projects above the channel. These timbers provide a bed upon which a tractor or other vehicle may be readily run and when the material of the bed becomes badly worn or torn up such timbers may be easily and quickly removed and replaced by fresh pieces. Thus the steel part of the turntable will be effectively protected against excessive damage.

By the provision of the steel bar or shaft 64 at each side of the turntable a means is provided whereby the cleats of a tractor may readily take hold so as to obtain the necessary traction for pulling a tractor onto the turntable.

As will be readily seen upon reference to Figure 1 the central unit or load carrier platform may be lowered to a position where it will rest upon the ground. In such position a machine such as a tractor can be readily run onto the turntable from the ground.

The turntable 60 is mounted for rotation on a single pivot post or pin 67 which is mounted upon the top of the I beam 26 which extends transversely of the platform 20. Upon the underside of the central channel beam 63 of the turntable there is welded or otherwise formed a socket member 68 having the downwardly opening socket 69 in which the pin 67 engages.

In order to maintain the turntable level and prevent wobbling upon its rotation, suitable supporting rollers 70 are mounted in desired positions upon the platform to be engaged by the underfaces of the channel beams 61 and 62 as is readily seen upon reference to Figures 3, 4 and 6.

The power means by which turning of the table 60 is effected, comprises a pair of piston cylinders 71 located within the platform frame beneath the turntable and each pivotally coupled at its outer end as at 72 to the inner side of a longitudinal beam 23. The outer end of the piston rod 74 extending from the other end of each cylinder is pivotally connected as at 75 to the adjacent block or body 68 in which the pivot pin socket 69 is formed.

As previously stated the power cylinders 71 are supplied with fluid under pressure from the control unit 59, as necessary to effect the turning of the turntable. As will be readily apparent the turntable may make a 90° turn or rotation so that if a long piece of machinery such as a tractor is run onto the table so that the ends of the machine extend a substantial distance outwardly beyond the sides of the platform, the turntable may be rotated 90° as stated so as to bring the length of the tractor into parallelism with the length of the platform. By this means long pieces of machinery or long bodies may be maintained in position upon the carrier platform without projecting beyond the sides of the trailer to thus create a traffic hazard.

Any suitable mounting may be employed for the rollers 70 as, for example, two of the rollers may be mounted between adjacent beams 23 and 25 as shown in Figure 6 and two other rollers may be mounted between pairs of short parallel bars 70' secured between the beams 23. It is to be understood, however, that the specific mounting arrangement here shown is not necessarily to be adhered to in the construction of the machine as any suitable means may be used for mounting the rollers 70 and additional rollers may be employed also if desired.

Figure 2 illustrates the load carrier platform in an elevated position where the adjacent ends of the beams 31 and 39 of the forward and rear rock frames 21 and 22 respectively are in upwardly directed position. Under certain conditions it is desirable to lock the forward and rear rock frames and the load carrier so that the load carrier cannot go down beyond a certain elevation and at the same time the strain may be relieved upon the fluid pressure cylinders and elevating rods 35 and 54 of the same. In order that parts of the trailer may be locked in this manner each of the beams 28 of the arms 27 has secured upon the top edge thereof the upwardly extending plate or web 76 in the top edge of which a cross notch 77 is formed. It will be readily understood that each of the frame beams 31 and 39 at its inner end, that is, the end with which the power piston is connected, in swinging downwardly will move between a pair of plates 76. Accordingly there is provided a chock bar 78 to be placed across the top edges of each two adjacent plates 76 as shown in Figures 7 and 8 whereupon the inner ends of the side beams of the rock frames are then lowered until they rest upon the bars 78 after which the pressure within the elevating cylinders may be further reduced without having the load carrier platform descend lower. In other words the platform will be locked in a prescribed elevated position and there is no need for maintaining a continued pressure of fluid in the elevating cylinders.

In addition to the fact that a trailer structure such as the one herein disclosed, has a novel load carrying platform which may be lowered to rest upon the ground so as to facilitate placing a load thereon and raised to a desired position for transporting the load, another advantage of the present construction resides in the fact that the load may be given a considerable elevation when necessary to make it possible to move the trailer structure over an elevated part of a roadway as, for example, in going over a level railroad crossing where it frequently happens that the roadway slopes up toward the crossing from both sides so that in moving a long trailer structure thereacross there is a possibility of the central part of the structure striking the trackway when the front wheels are on one side and the rear wheels on the other. In such a situation the load carrier can be given extra elevation so as to clear the raised part of the road.

I claim:

1. A tractor trailer structure for connection with a tractor truck, comprising a load carrier, a pair of beams at each end thereof, the beams of each pair being spaced apart transversely of the structure and extending lengthwise of the structure, a transverse pivotal connection between each pair of beams inwardly from one end thereof and the adjacent end of the carrier, a transverse horizontal pivot between one pair of beams between the other end of the same and said pivotal connection therefor and the rear of the tractor truck, a wheeled trailer truck, a transverse horizontal pivot between the other end of the other pair of beams and the pivotal connection therefor and the trailer truck, and power mechanism between each pair of beams at the said one end thereof and the adjacent end of the load carrier for vertically swinging each pair of beams on the transverse horizontal pivot therefor to effect raising and lowering of the carrier.

2. A tractor trailer structure of the character stated in claim 1, with means for locking the carrier and the two pairs of beams together against downward movement of the carrier beyond a desired elevation.

3. In a tractor trailer, front and rear wheeled truck units, a load carrier located between said units, and elongate vertically oscillatable structure positioned over and supported upon each wheel unit, each of said structures having a portion of one end extending beyond its supporting wheel unit toward the other wheel unit, means suspending the load carrier from and at points inwardly of the ends of the extended portions of said vertically oscillatable structures, and power thrust means carried by the load carrier beneath said extended end portion of each of said vertically oscillatable structures and connected with said ends of the extended portions of the last mentioned structures, the said means suspending the load carrier from the vertically oscillatable structures being pivotal.

4. In a tractor trailer of the character described, a front wheel unit having a chassis, a rear wheel unit having a chassis, a forward frame structure, means coupling the frame structure with the front wheel unit for vertical oscillation on a transverse axis and for turning on an axis perpendicular thereto, a rear frame structure, means coupling the rear frame structure with the rear wheel unit for vertical oscillation on an axis paralleling the first mentioned axis, each of said frame structures having an end extending beyond its supporting unit toward the other unit, a load carrier positioned between said units and having an end adjacent to the said end of the adjacent frame structure, a pair of hanger arms extending upwardly from each end of the load carrier, a pivot coupling between the arms of each pair and the adjacent frame structure between the said end of the frame structure and the said transverse axis therefor, a power thrust means between each end of the load carrier and the extended end of the adjacent frame structure, said arms extending upwardly in divergent relation, an upstanding plate carried upon the top side of each of said arms, and means for locking each of said plates with the adjacent extended end of the adjacent frame structure for securing the said extended end of the frame structure against downward movement beyond a predetermined position and to secure the carrier against downward movement beyond a predetermined elevation.

5. A tractor trailer structure comprising a front wheel unit having a wheel supported chassis, a rear wheel unit having a wheel supported chassis, an elongate frame disposed over and longitudinally of the front unit chassis and comprising spaced parallel side beams and a cross connecting plate between the beams adjacent to the front ends thereof, means pivotally coupling said plate with the underlying chassis for vertical oscillation of the frame on a transverse axis, an elongate frame disposed over and longitudinally of the rear unit chassis and comprising spaced parallel side beams and a cross connecting plate between the beams adjacent to the rear ends thereof, a pivotal coupling between the last named plate and the rear unit chassis for vertical oscillation of the rear frame on a transverse axis, a central load carrier between the wheeled units, said elongate frames each having a portion of the end remote from the pivot therefor projecting beyond the underlying chassis, an upwardly inclined pair of arms extending rigidly from each of two ends of the carrier toward the projecting portion of the adjacent frame, a transverse pivot coupling between the upper end of each arm and the adjacent frame beam at a point inwardly of the said projecting end of the frame, and a thrust imparting power unit supported at each of the said ends of the load carrier and connected with the adjacent overlying projecting frame portion on the side of the arm pivot coupling remote from the frame pivot means for forcing the adjacent end of the load carrier away from the adjacent projecting frame portion.

6. The invention according to claim 5, wherein each of said arms comprises two spaced parallel members between which the adjacent beam is positioned at the upper end of the arm, and a shelf plate secured across between the members of each arm at the lower ends thereof on which one of said power units is supported.

7. In a tractor trailer of the character described, a front wheel unit having a chassis, a rear wheel unit having a chassis, a forward elongate frame structure overlying the front unit chassis, means coupling the frame structure with the front wheel unit chassis for vertical oscillation on a transverse axis and for turning on an axis perpendicular thereto, a rear elongate frame structure overlying the rear unit chassis, means coupling the rear frame structure with the rear wheel unit chassis for vertical oscillation on an axis paralleling the first mentioned axis, each of said frame structures having an end portion extending beyond its supporting unit toward the other unit, a load carrier positioned between said units and having an end adjacent to the said end of the adjacent frame structure, a pair of hanger arms extending upwardly from each end of the load carrier, a pivot coupling between the arms of each pair and the said end portion of the adjacent frame structure between the terminus of said end portion of the frame structure and the said transverse axis thereof, a power thrust means between each end of the load carrier and the said terminus of the extended end portion of the adjacent frame structure, and means for locking together the said arms of the load carrier and the adjacent frame structure for securing the load carrier against downward movement beyond a predetermined elevation.

DAVE M. MANNING.

References Cited in the file of this patent

UNITED STATES PATENTS

| Number | Name | Date |
|---|---|---|
| 1,208,693 | Swanson | Dec. 12, 1916 |
| 1,301,616 | Stephenson et al. | Apr. 22, 1919 |
| 1,310,144 | Schneider | July 15, 1919 |
| 1,802,439 | Moore | Apr. 28, 1931 |
| 2,157,404 | Dodge | May 9, 1939 |
| 2,350,841 | Troche | June 6, 1944 |
| 2,522,357 | Framheim | Sept. 12, 1950 |

FOREIGN PATENTS

| Number | Country | Date |
|---|---|---|
| 475,232 | Great Britain | Nov. 16, 1937 |